United States Patent
Allen (10) Patent No.: US 9,811,459 B1
(45) Date of Patent: Nov. 7, 2017

(54) DATA STORAGE OPTIMIZATION FOR NON-VOLATILE MEMORY

(71) Applicant: Amazon Technologies, Inc., Reno, NV (US)

(72) Inventor: Nicholas Alexander Allen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/305,894

(22) Filed: Jun. 16, 2014

(51) Int. Cl.
*G06F 12/00* (2006.01)
*G06F 12/02* (2006.01)
*G06F 9/32* (2006.01)

(52) U.S. Cl.
CPC .......... *G06F 12/0246* (2013.01); *G06F 9/321* (2013.01); *G06F 2212/7207* (2013.01)

(58) Field of Classification Search
None
See application file for complete search history.

(56) References Cited

U.S. PATENT DOCUMENTS 8,560,760 B2 * 10/2013 Dhokia ............... G06F 12/0246
711/103

OTHER PUBLICATIONS

"Gray Code," Wikipedia, The Free Encyclopedia, <https://en.wikipedia.org/wiki/Gray_code> [retrieved Sep. 8, 2016], 16 pages.

* cited by examiner

*Primary Examiner* — Brian Peugh
(74) *Attorney, Agent, or Firm* — Davis Wright Tremaine LLP (57) ABSTRACT

Non-volatile devices may be configured such that a clear operation on a single bit clears an entire block of bits. The representation of particular data structures may be optimized to reduce the number of clear operations required to store the representation in non-volatile memory. A data schema may indicate that a data structure of an application may be optimized for storage in non-volatile memory. A translation layer may convert an application level representation of a data value associated with the data structure to an optimized storage representation of the data value before storing the optimized storage representation of the data value in non-volatile memory.

20 Claims, 8 Drawing Sheets

DATA STORAGE OPTIMIZATION FOR NON-VOLATILE MEMORY

BACKGROUND

Many computing systems, including networked computing systems, contain non-volatile storage devices configured with memory for storing data and other information. These computer systems may be used to execute a variety of different applications. In addition, resources for network computing and storage are often provided by computing resource providers who leverage large-scale networks of computers, servers and storage drives to enable clients, including content providers, online merchants and the like, to host and execute a variety of applications and web services. Applications executing on these and other computer systems may frequently increment values stored in non-volatile storage. This may be a common operation in many sequential and transactional processing applications, such as a database or queue manager. These applications may increment values frequently or even as part of every operation to maintain data consistency.

Performing these may be operationally expensive for certain types of non-volatile storage devices. For example, in many storage devices, the substrate used for data storage and the controller used for data storage are configured such that flipping bits (i.e., changing their state from zero to one (also referred to as "off" or "on") or vice versa) is slower and operationally more complex in one direction than in the other. In some examples, flipping a bit in one direction requires caching data around the bit, clearing the data around the bit, and rewriting the data around the bit such that the result reflects the flipped bit. Flipping in the other direction, however, may not require such operations and often the bit may be flipped without affecting the surrounding bits. As a result, similar data operations (e.g., updating a stored value) can have highly variable performance characteristics depending on how the corresponding bits are flipped during such operations.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to enhancements for storing data in non-volatile memory. Applications executing on computer systems and/or virtual computer systems may maintain data in application memory. The application memory may be tied to one or more storage devices of the computer systems, including non-volatile storage devices. For example, a computer system may include a solid-state hard drive configured to persist the application's memory. A translation layer may modify the storage representation for particular values included in the application's memory in order to improve performance of the non-volatile storage. The modified storage representation may be implemented without modification to the application or operation of the application.

A variety of different storage devices may have asymmetric performance profiles for updating a value stored in the storage device. For example, a storage device using charge nodes, such as a charge trap or floating-gate metal-oxide-semiconductor field-effect transistor (MOSFET), may permit changing a single bit or bits in a particular direction. However, in order to change the bit in the opposite direction the storage device may require altering a much larger group of bits. These types of non-volatile storage devices may be configured such that a large number of charge nodes are wired together in a group or block of bits in order to enable a clear operation. The clear operation may require additional power to be performed, thereby requiring a large number of charge nodes to be wired together in order to obtain sufficient power to clear the charge nodes. Therefore, changing or flipping a particular bit in the storage device from 0 to 1 may require a single operation on the particular bit but changing the particular bit from 1 to 0 may require additional operations, including clearing or erasing a large number of bits. For example, changing the particular bit from 1 to 0 may require the storage device to copy the data contained in the block of bits, including the change to the particular bit from 1 to 0, to a new block of bits and clearing the previous block of bits where the data was contained. Other storage devices may have similar performance characteristics when reversing or otherwise changing particular bits of the storage devices.

Particular data structures, such as counters, frequently include both 0 to 1 bit transitions as well as 1 to 0 bit transitions. As the counter is incremented or decremented, the storage device may be required to do multiple copy, write and clear operations. The use of clear operations may cause performance that is considerably slower than operations involving read or write operations without clear operations. Additionally, clear operations (also referred to as erasures) may have an aggregate effect of reducing the lifespan of a storage device, increasing operational cost of an application that utilizes the storage device. This translation layer may selectively identify data structures, such as an incrementing value, and recode or otherwise modify the data structure's storage representation in order to reduce the number of cross-directional bit transitions (e.g., changing a particular bit from 1 to 0 as described above). A cross-directional bit transition may be any changing or flipping of a particular bit in a storage device that requires the storage device to copy, write and clear bits of the storage device.

The translation layer may also selectively identify or otherwise detect values that may be recoded or otherwise modified such that the storage representation of the values may reduce the number of clear operations required to be performed by the storage device. The storage representation may additionally use the range of representable values sparsely in order to reduce the number of clear operations required to be performed by the storage device. Sparse representations are representations that account for most or all information of a data field with a linear combination of a small number of elements. Often, the elements are chosen from an over-complete dictionary. Formally, an over-complete dictionary is a collection of elements such that the number of elements exceeds the dimension of the space elements of the data field, so that any data field or value thereof may be represented by more than one combination of different elements. The use of sparse representations may vary for particular data structures and/or data values based at least in part on performance and storage capacity. For example, the storage representation of particular values of the data field may be configured such that the number of clear operations required by the non-volatile memory to store the data field is reduced.

In some embodiments, the number of clear operations may be reduce to zero. For example, if the data field is a 32 bit counter the optimized storage representation may be configured such that each bit is a counter value, thereby reducing the number of clear operations to zero and the number of values that may be represented by the 32 bit data field to zero to thirty two. However, reducing the number of clear operations to zero may require increased storage capacity in order to store the optimized storage representation. As in the example above, in order to increase the maximum possible value of the counter the number of bits used to store the counter must be increased. In a specific example, when an application is incrementing integers from zero to ten (base ten) the operations involve at least one binary zero-to-one transition and five one-to-zero transitions: 0000, 0001, 0010, 0011, 0100, 0101, 0110, 0111, 1000, 1001 and 1010.

The translation layer may determine an alternative recoding of the counter value in order to reduce or eliminate the number of cross-directional bit transitions. An alternative recoding in binary format the integers from zero to ten (base ten) by the translation layer may include sliding a '1' bit across with periodic resets in order to introduce '0' bit markers reducing thereby the number of cross-directional bit transitions from 5 to 2: 0000, 0001, 0011, 0111, 1111, 0010, 0110, 1110, 0100, 0101, 1101. The translation layer may maintain information mapping optimized storage representations of values to corresponding application values. Returning to the example above, the optimized storage representation 0111 may correspond to the application counter value 0011 and mapping information associated with the mapping of 0111 to 0011 may be maintained by the translation layer. In some embodiments, the translation layer may convert between optimized storage representation and application representation using an algorithm or function based conversion without storing additional mapping information. For example, the translation layer may use a conversion algorithm to recode values before storing the recode value in non-volatile storage.

In some embodiments, the recoding data contained in the memory of the application to an optimized storage representation may be extended to an arbitrarily large block size provided the range of possible values are obtainable in advance. For example, a counter value may be extended to an arbitrary block size in order to efficiently represent large counter values. Data structures may also be recoded in an optimized storage format by chaining multiple blocks or groups of optimized bits together using an increment-and-carry method. For example, an 8-bit counter value may be recoded to an optimized storage format such that the total number of values the 8 bit counter may represent is reduced to 200. An increment and carry method may be used to connect two or more 8 bit counters recoded to the optimized storage format in order to obtain values above 200. Data in the optimized storage format may consume and/or utilize fewer computing resources then data in the non-optimized format when interacted with by a computer system. Additionally, operations on data in the optimized storage format may have less latency then operations on data not in the optimized format when performed by the computer system. For example, operations on data stored in the optimized format may have less latency then data stored in the non-optimized format.

The translation layer may operate between the application and the non-volatile storage of the computer system executing the application in order to recode application data to the optimized storage format. Furthermore, a hypervisor or other administrative application may support the function of the translation layer. For example, the hypervisor may periodically sample application memory in order to determine one or more data structures of the application that may be recoded to the optimized storage format. In some embodiments a storage device may further transform the value to perform error correction, such as by implementing storage using Hamming codes. Recoding may integrate with error correction by changing the step size between the recoded values so as to maintain the Hamming distance requirements of the code.

To provide optimized data storage, the translation layer may first determine based at least in part on a data schema associated with a particular data field that the particular data field is capable of optimization, for example, a determination that the data field is to be updated in an incremental manner. The determination may be using a variety of techniques, such as obtaining application memory as described above. The data schema may also be determined based at least in part on information associated with the application. For example, the application may have a database with an associated description annotating a declaration for the data field. Additionally, the application may indicate a particular area of memory is capable of optimization. For example, the application may pass a flag to the read or write operations for the data field indicating that the data field is a counter. Alternatively, the determination may be inferred from an existing data schema that identifies the data field as a sequence number, counter, or other data type that is commonly used in an incrementing fashion.

In some embodiments, the data field may be updated based at least in part on one or more constraints to the data field. The one or more constraints may define limits to the values that may be used to update the data field. For example, the one or more constraints may cause the data field to be updated in a particular identified sequence or according to a sequence that has one or more identified properties, such as being an integer sequence that is monotonically increasing or decreasing, possibly strictly monotonically increasing or decreasing. Similarly, the one or more constraints may cause the data field to be decremented by a particular value when the data field in interacted with. In some embodiments, the one or more constraints may cause the data field to be correlated to a sequence such that the data field is updated in accordance with the sequence, but not every value in the sequence is used. For instance, the one or more constraints may cause updates to the data field to be correlated to the sequence of counting numbers (e.g., 1, 2, 3, 4 . . . ), such that updates may be members of the sequence but updates may skip some values in the sequence (e.g., 1, 3, 5, 9 . . . ). Additionally, the one or more constraints may put a limit on the values that may be used to update the data field. For example, the one or more constraints may indicate that only whole numbers may be used to update the data field. As described above, the one or more constraints may be determined based at least in part on the data schema associated with the data field.

The translation layer may then, in response to receiving a new value for the data field, convert the new data field value from an application memory format to the optimized storage format. The conversion may be performed, by the translation layer, as part of the write operation. For example, the translation layer may transform or otherwise recode the new value before the new value is sent to the storage device. In some embodiments, the conversion may incorporate a lookup table or other conversion information to optimize recoding. For example, the translation layer may maintain a mapping of particular values to recoded values, such as 0111 to 0011 in the example above. The translation layer may then determine whether an old data field value is compatible with performing an optimized write of the new data field value. The determination may rely on retaining the old value in memory of the storage device if operated on by a single write or may be performed by reading the old value prior to writing the new value.

The translation layer may also select a write method based at least in part on the determination of whether the old data field value is compatible with performing the write operation of the data field value in the optimized storage format. A variety of different write methods may be used by the translation layer including a single non-clear update, multiple non-clear update, or to perform a clear update. For example, the translation layer may maintain a buffer as described above and wait until multiple updates require a clear operation before performing the clear operation and updating the storage device. The translation layer may then cause the new data field value to be written to the non-volatile storage device using the selected write method. The translation layer may also be responsible for retrieving data from the storage device and converting the data back to a format that may be used by the application. For example, in response to receiving a read request for the data field, the translation layer may retrieve the new data field value from the storage device and convert the new data field value from the optimized storage format to the application memory format.

In some embodiments, storage of application memory in the storage device may be modified such that application memory that is recoded in the optimized data format is maintained in a separate area of memory in the storage device than application memory that is not optimized. In this way clear operations required for storage of the application non-optimized memory may not cause a clear operation to be performed on application memory recoded in the optimized data format. For example, the translation layer may translate memory locations of optimized and/or non-optimized data in order to maintain the data in two or more separate locations. The translation layer may maintain a start location of the application's memory and an offset within the application's memory indicating the area or areas of the application's memory to be recoded in the optimized data format. The translation layer may utilize an algorithm or map to convert an address of a data field from an application memory address to a physical address corresponding to the non-volatile memory. Furthermore, a buffer of application memory recoded in the optimized data format may be maintained in order to reduce the number of cross-directional bit transition. For example, a buffer of recoded data may be maintained until a certain number of clear operations associated with the recoded data in the buffer is reached, a clear operation may then be performed on the storage device and the buffer may be written to the storage device. By maintaining at least some of the recoded data that requires a cross-directional bit transition in the buffer the number of cross-directional bit transitions may be reduced.

Figure 1:
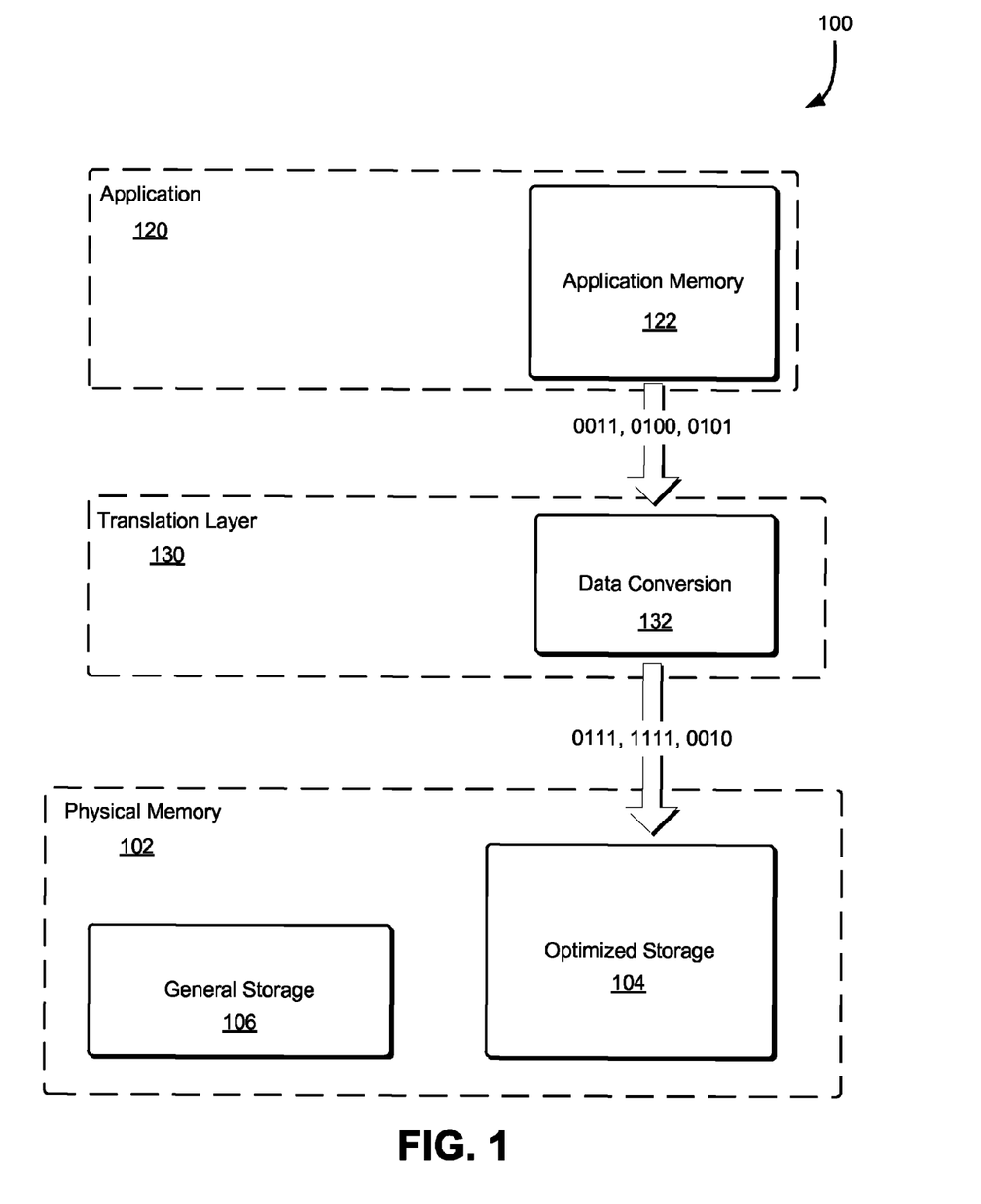
FIG. 1 is an illustrative environment where application memory may be converted and stored in optimized storage in accordance with at least one embodiment.

FIG. 1 is an illustrative environment 100 where one or more computer systems, as well as the associated code running thereon, may optimize data for storage with one or more non-volatile storage devices. The one or more computer systems may be a distributed computer system executing in a service provider environment. The one or more computer systems may include physical memory 102. The physical memory 102 may include one or more non-volatile storage devices, such as a solid-state drive, hard disk drive or optical drive. Furthermore, the physical memory 102 may be implemented as a block-level storage device. The block-level storage device may enable the persistent storage of data used/generated by the one or more computer systems and/or an application 120 where the one or more computer systems and/or the application 120 may only provide ephemeral data storage. The application 120 may provide ephemeral data storage in an application memory 122.

The physical memory 102 may include general storage 106 and optimized storage 104. The optimized storage 104 may be managed by a translation layer 130 and configured such that the storage representation of data contained in optimized storage 104 is configured to reduce the number of cross-directional bit transition. The general data storage 106 may be configured such that the data stored in the general data storage 106 is not configured to reduce the number of cross-directional bit transition. Furthermore, the general storage 106 and optimized storage 104 may be positioned and maintained within the physical memory 102 such that the optimized storage 104 and general storage 106 do not share bits in a group of bits wired together as a clear block. The physical memory 102 may be configured such that groups or blocks of bits are wired together such that a clear operation on one bit of the block clears all the bits contained in the block, described in greater detail below in connection with FIG. 2.

The application 120 may be used for various purposes, such as to operate as servers supporting a website, to operate business applications, or, generally, to serve as computing power for the customer. In other examples, the application 120 may be a database application, electronic commerce application, business application, operating system application and/or other application. The application memory 122 may be a portion of computer system memory used by the application 120 to store data generated by the application 120. The translation layer 130 may be a component of the computer system illustrated in FIG. 1. For example, the translation layer may be a device driver for the storage device containing physical memory 102. In various embodiments, the translation layer 130 is a component of an operating system executed by the computer system. The translation layer 130 may be responsible for data conversion 132 between the optimized storage 104 and the application memory 122. Data conversion 132 may include recoding at least a portion of the application memory 122 to an optimized storage format as described above. The optimized storage format may be configured such that data stored in physical memory 102 in the optimized storage format may require fewer cross-directional bit transitions.

Figure 2:
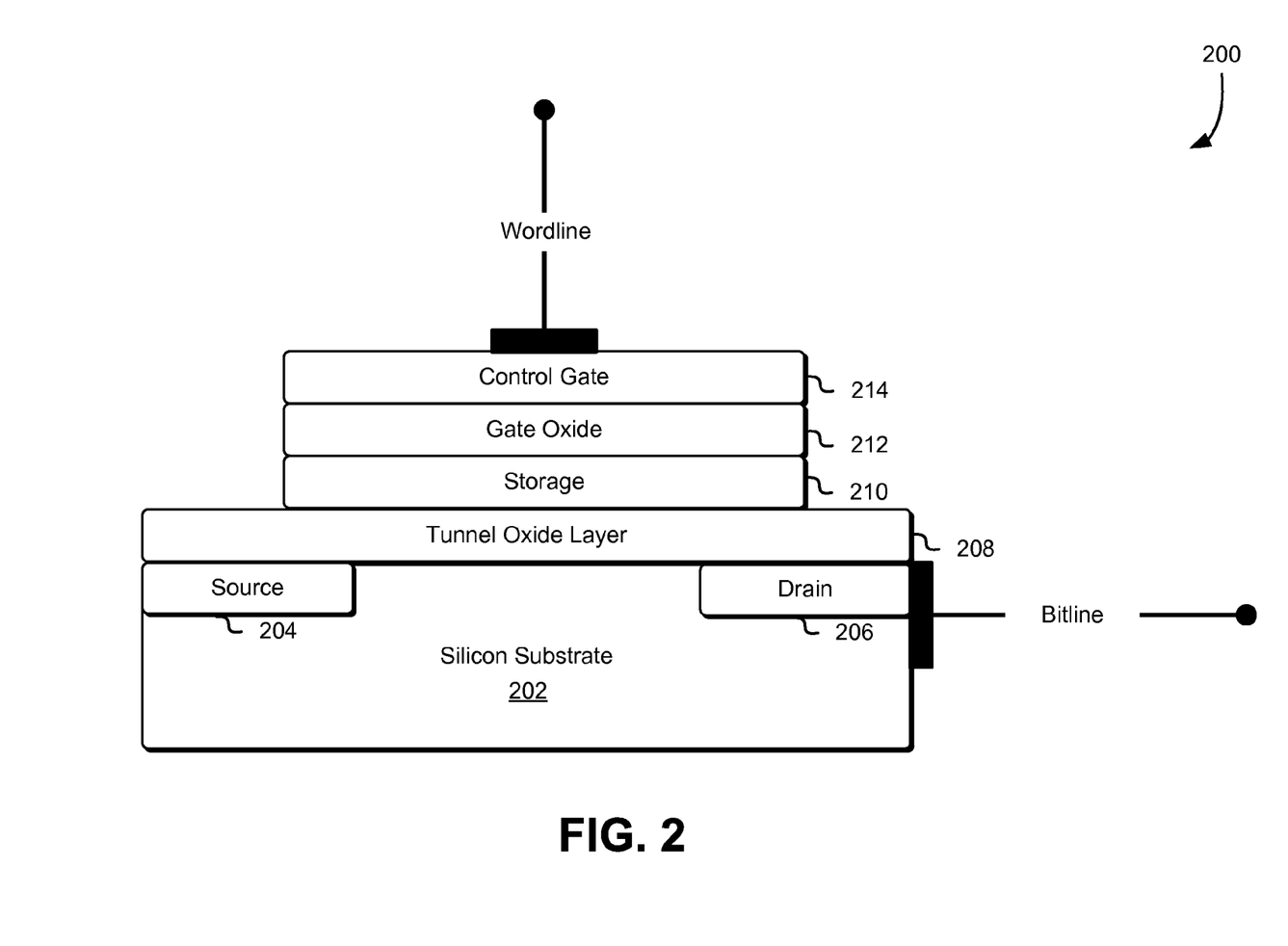
FIG. 2 is an illustrative example of a non-volatile storage device in accordance with at least one embodiment.

FIG. 2 illustrates a charge node 200 (also referred to as a MOSFET) of a non-volatile storage device in accordance with at least one embodiment. The non-volatile storage device may include a plurality of charge nodes 200 and each charge node 200 may provide storage for one bit of data (e.g., 0 or 1). The charge node 200 may include a silicon substrate 202 connected to a source 204 and a drain 206. The silicon substrate 202 may be a thin slice of material, such as silicon, silicon dioxide, aluminum oxide, sapphire, germanium, gallium arsenide, an alloy of silicon and germanium, or indium phosphide which may provide a foundation upon which the charge node 200 is deposited. The material deposited may include a tunnel oxide layer 208, storage 210, gate oxide 212 and a control gate 214.

The tunnel oxide layer 206 may be layer deposited onto the silicon substrate 202 that insulated the storage 210 from other regions of the non-volatile storage device. The tunnel oxide layer 208 may comprise an oxide, such as silicon dioxide. The storage 210 may include a variety of different elements, such as a charge trap or floating gate. The storage 210 may be any element capable of storing the modulation of charge concentration between a body electrode and the control gate 214 located above the storage 210 and insulated from all other regions of the non-volatile storage device by the gate oxide 212. If the storage 210 is not charged (e.g., neutral), then a positive charge in the control gate 214 creates a channel in the silicon substrate 202 that carries a current from source 204 to drain 206. If, however, the storage 210 is negatively charged, then this charge may shield a channel region of the silicon substrate from the control gate 214 and prevent the formation of a channel between the source 204 and the drain 206.

The charge node 200 may include a word line and a bit line. The word line may be used for addressing the particular bit corresponding to the charge node 200. The bit line may be used for determining the value stored in the storage 210 of the charge node 200. Multiple charge nodes 200 may be arranged in the non-volatile storage device into blocks. The clears may be done on complete blocks of charge nodes 200 of the non-volatile storage device. For various non-volatile storage devices, write and clear operations may be slow operations and therefore organizing charge nodes 200 into blocks may increase performance of the storage device. However, for certain data structure this type of organization may require a large number of clear operations.

Figure 3:
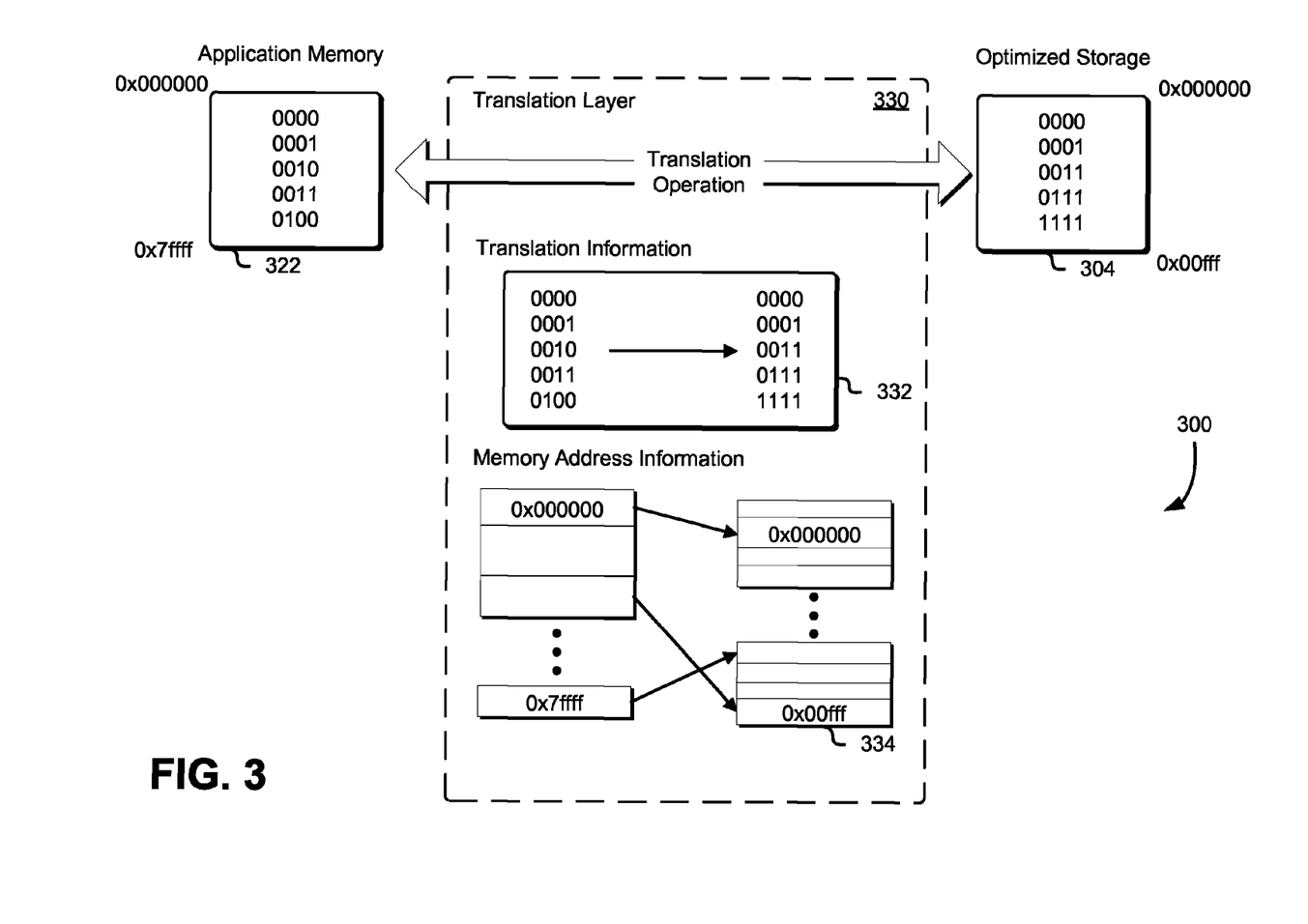
FIG. 3 is an illustrative environment where a translation layer may optimize data in accordance with at least one embodiment.

FIG. 3 is an illustrative environment 300 where one or more computer systems, as well as the associated code running thereon, may optimize data for storage with one or more non-volatile storage devices, such as the non-volatile storage devices described above in connection with FIG. 2. As illustrated in FIG. 3, data contained in application memory 322 may be translated and/or recoded for optimized storage 304. Both the application memory 322 and the optimized storage may contain an addressable memory space. For example, an application may access a particular data object stored in the optimized memory 304 based at least in part on a memory address associated with the data object. A translation layer 330 may be responsible for recoding data stored in application memory 322 into an optimized storage format for storage in the optimized storage 304. Furthermore, the translation layer 330 may also contain information suitable for locating data objects based at least in part on a memory address associated with the data object.

The translation layer may also include a map of data values contained in memory to corresponding data values in the optimized data storage format. For any given update in the sequence data values in the optimized storage format, the map may not provide an immediate reduction in the number of clears. In fact, for some set of updates, there may be an increase in the number of clear operations for that set of updates in the optimized data storage format as opposed to the in-memory format for the application. However, after a large number of updates in order of the sequence, there may be an overall net reduction of the number of clear operations required to store the data values in optimized storage format in the non-volatile storage. Furthermore the mapping may be reversible, such that a data value may be converted from optimized storage format to an in-memory format of the application based at least in part on the map. As described herein a map may include a table, an algorithm, a set of operations, a deterministic function or other mechanism suitable receiving an input and determining a corresponding output.

The translation layer 330 may contain memory address information 324. The memory address information 324 may be configured to locate data objects stored in optimized storage 304. For example, the memory address information 324 may include a page table or other lookup table configured with one or more records indicating a particular optimized storage 304 address associated with application memory 322 address. When an application writes a new value to a data object managed by the translation layer 330, the translation layer 330 may recode the data object and determine, based at least in part on the memory address information 324, a location in the optimized storage 304 to store the recoded data object. Similarly, if the application attempts to read a data object from the optimized storage 304, the translation layer 330 may determine, based at least in part on an application memory address associated with the data object and the memory address information 324, the location of the data object in the optimized storage 304. The translation layer 330 may then retrieve the data object from optimized storage 304 and recode the data object to a non-optimized data format before providing the data object to the application.

Along with the memory address information 324 the translation layer 330 may maintain translation information 332. The translation information 332 may be usable by the translation layer 330 to recode data objects from the non-optimized data format to the optimized data format as well as from the optimized data format to the non-optimized data format. As illustrated in FIG. 3, the translation information 332 may map particular values of data objects stored in application memory 322 to corresponding representations of the particular values for storage in the optimized storage 304. In various embodiments, the translation information 332 may be information corresponding to an algorithm or set of operations to be performed on the particular data values in order to recode that data object to the optimized storage format.

Figure 4:
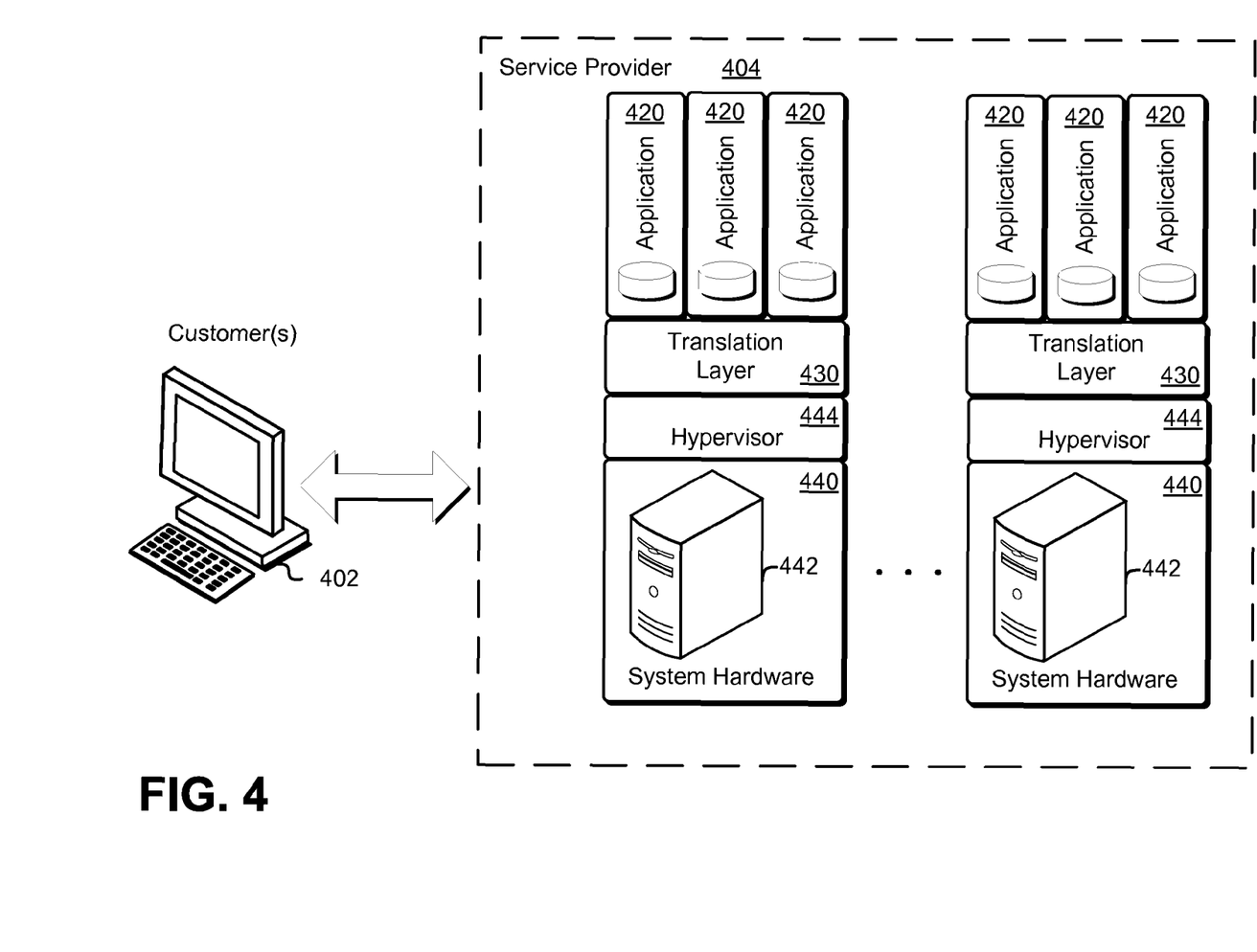
FIG. 4 is an illustrative environment where a translation layer may provide optimized data storage for applications executing on system hardware in accordance with at least one embodiment.

FIG. 4 illustrates various applications executing on computing resources operated by a service provider 404 in accordance with at least one embodiment. The application may be supported by system hardware 440. The system hardware 440 may be used by a service provider 404 to provide computing resources for customers. The service provider 404 may include website operators, online retailers, social network providers, cable providers, online game providers, or any entity capable of providing computing resources to customers. The system hardware 440 may include physical hosts 442 also referred to as a host computer system. The physical hosts 442 may be any device or equipment configured to execute instructions for performing data computation, manipulation or storage tasks, such as a computer or a server. A physical host 442 may be equipped with any needed processing capability, including one or more processors, such as a central processing unit (CPU), a memory management unit (MMU), a graphics processing unit (GPU) or a digital signal processor (DSP), memory, including static and dynamic memory, buses and input and output ports that are compliant with any handshaking, communications or data transfer protocol. The system hardware 440 may also include storage devices, such as storage disks and tapes, networking equipment and the like. The storage devices may include at least some non-volatile storage configured to provide storage for one or more applications 420.

A virtualization layer executing on the physical host 442 enables the system hardware 440 to be used to provide computational resources upon which one or more virtual machines 420 may operate. For example, the virtualization layer may enable the applications 420 to access system hardware 440, such as the non-volatile storage device, on the physical host 442 through virtual device drivers on the virtual machine 420. Furthermore, physical host 442 may host multiple hypervisors of the same or different types on the same system hardware 440. The hypervisor 444 may be any device, software or firmware used for providing a virtual computing platform for the virtual machines 420. The virtual computing platform may include various virtual computer components, such as one or more virtual CPUs, virtual memory management units, virtual memory and the like. As described above, the hypervisor 444 may periodically or aperiodically sample or otherwise collect information corresponding to the applications' 420 memory. Furthermore, a translation layer 430 may optimize data for storage in the non-volatile storage of the physical host 442. The translation layer 430 may be any device, software or firmware usable to optimize at least a portion of the physical hosts 442 non-volatile storages. For example, the translation layer 430 may be a virtual device driver loaded into the hypervisor 444 or operating system of the physical host 442.

As described above, the applications 420 may be used for various purposes, such as database applications, electronic commerce applications, business applications, and/or other applications. The application 420 may, during the course of operation, cause data to be written to non-volatile storage of the physical host 442. The hypervisor 444 may enable the application to access the non-volatile storage of the physical host 442. Furthermore, the hypervisor 444 may be configured such that the hypervisor 444 may access the memory and/or other portions of the application 420. For example, the hypervisor 444 may operate at an administrator level of the physical host 442 thereby allowing the hypervisor 444 to access one or more restricted computing resources of the physical host 442. The hypervisor 444 may then gather activity, operational information or statistics corresponding to the application 420. The information may be gathered or compiled over an interval of time or taken at one or more snapshots in time.

The hypervisor 444 or other component, such as the translation layer 430, may then determine one or more areas of memory of the application 420 that may be optimized based at least in part on the information collected by the hypervisor 444. For example, compression operations may be performed on a copy of the applications' 420 memory and an entropy value for the memory may be calculated. One or more patterns may then be discovered in the applications' 420 memory based at least in part on the entropy. Patterns in values stored in applications' 420 memory may then be detected over a period of time. If the values are part of an order sequence the translation layer 430 may then determine a recoding format such that the data values are optimized for storage in non-volatile memory of the physical host 442 by at least requiring fewer cross-directional bit translations.

Figure 5:
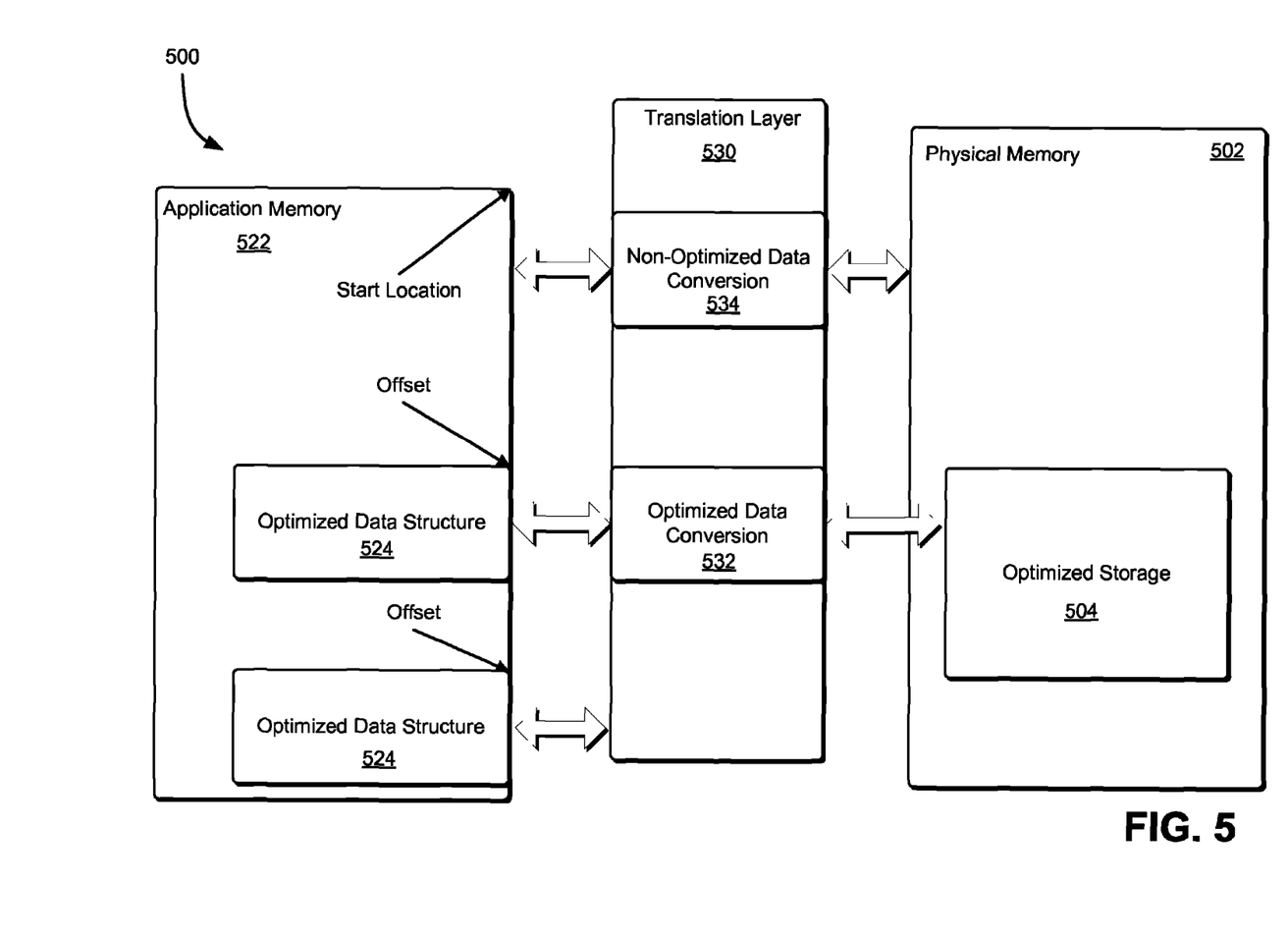
FIG. 5 is an illustrative example of a translation layer optimizing application memory in accordance with at least one embodiment.

FIG. 5 is an illustrative environment 500 where one or more computer systems, as well as the associated code running thereon, may optimize data for storage in memory of one or more non-volatile storage devices. A translation layer 530 may operate as an intermediary between an application 520 and physical memory 502. The translation layer 530, application 520 and the physical memory 502 may all be executing on the same or different host computer systems, such as the physical host described above. For example, the application 520 and translation layer 530 may be executing on a first host computer system and the physical memory 502 may be a network storage device connected to the application over a network. The physical memory 502 may contain one or more optimized storage 504. The optimized storage 504 may correspond to memory locations of the physical memory 502 that have been recoded in an optimized data format by the translation layer 530.

The translation layer may recode one or more optimized data structures 524 contained in application memory 522. The optimized data structures 524 may include any data structure that contains successive values of an order sequence which may be identifiable as such. For example, the optimized data structures 524 may be the sequence of prime numbers starting with 1. The optimized data structure 524 may be identified by a user, the application or some other application, such as the hypervisor described above in connection with FIG. 5. Furthermore, the translation layer may be responsible for writing optimized data and non-optimized data of the application memory 522 to the physical memory 502. For example, the translation layer 530 may be exposed to the application as a device driver or other interface configured to enable the application to persist data to physical memory 502.

The translation layer 530 may perform optimized data conversion 532 and non-optimized data conversion 534. The non-optimized data conversion 534 may apply the identity transformation to the data being written to memory. In various embodiments, the identity transformation when performed on data by the translation layer 530 does not alter or modify the bits of data. The translation layer 530 may also write the data contained in application memory directly to memory without performing conversion of the data. The translation layer 530 may store or otherwise have available information corresponding to the application memory 522, such as a start location and one or more offsets. The one or more offsets may indicate within the application memory 522 the location of corresponding optimized data structures. When the translation layer receives a request to interact with application memory 522 and/or optimized storage 504 the translation layer 530 may determine, based at least in part on the one or more offsets, if the request includes a request to interact with data in the optimized storage format. For example, if a particular offset maintained by the translation layer 530 indicates that the requested data corresponds to the optimized data structure 524, the translation layer 530 may then perform the appropriate data conversion operation, such as converting the data to the optimized storage representation as described above.

Figure 6:
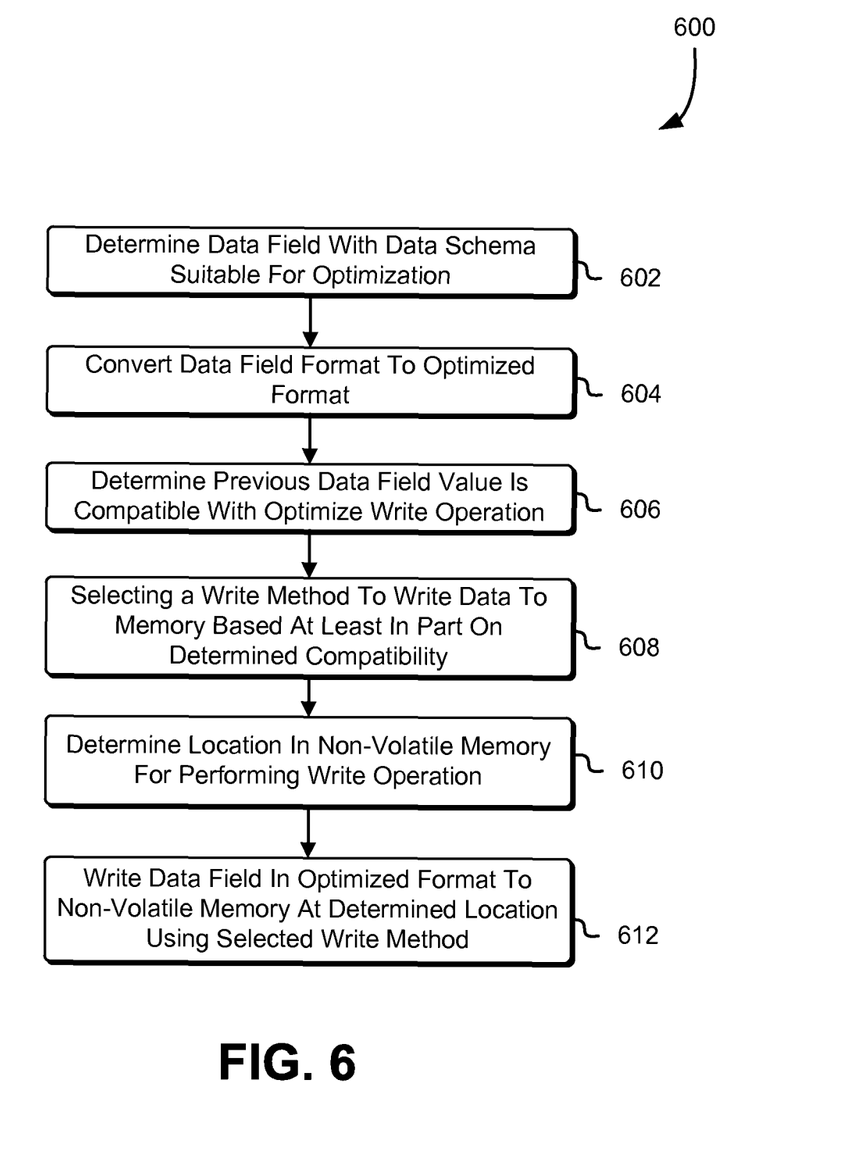
FIG. 6 is an illustrative example of a process for optimizing data written to non-volatile storage in accordance with at least one embodiment.

FIG. 6 shows an illustrative example of a process 600 which may be used to recode data values to an optimized storage format for storage in non-volatile storage devices. The process 600 may be performed by any suitable system, such as by translation layer 530 as described in connection with FIG. 5. Returning to FIG. 6, in an embodiment, the process 600 includes determining one or more data fields with data schema suitable for optimization 602. For example, a user of an application may indicate that the application utilizes a particular data field as a counter during operation. In another example, the application may be a database with a published data schema indicating that a particular data field is a counter associated with a particular row. A hypervisor or other administrative application may also determine the one or more data fields based at least in part on information obtained from the application or memory of the application. The data schema may be any schema indicating that the data field contains sequential values which are ordered and progress in a predictable pattern, such as a counter or twenty-four hour clock.

The translation layer may then convert the one or more data fields to an optimized data format 604. For example, the data fields may be stored in the application memory in a two's complement memory format, The translation layer may convert two's complement memory format to a sliding optimized data format as described above such that the sliding optimized data format reduces the number of cross-directional bit transitions. Furthermore, the translation layer may generate a lookup table or other information suitable for converting data value between formats. The translation layer may then determine a previous data field value corresponding to the one or more data fields is compatible with an optimize write operation 606. For example, if a value of the data field stored in non-volatile memory is null or empty the translation layer may write the data in optimized data format to non-volatile memory without requiring a cross-directional bit transition. However, if writing the optimized data to non-volatile memory would require a cross-directional bit transition the translation layer may buffer the data, select a new location to store the data or other operation that may not require a cross-directional bit transition.

The translation layer may also select a write method for writing the optimized data to non-volatile memory based at least in part on the value contained in the previous data field 608. For example, the translation layer may select a single non-erasure update, multiple non-erasure updates or an erasure update. The translation layer may then determine a location in non-volatile memory for performing the selected write operation 610. For example, the translation layer may determine an area of non-volatile memory such that the data field is contained in a block of non-volatile memory that does not contain data in a non-optimized format. This may reduce the number of clear operation performed on the optimized data as a result of a clear operation being performed on non-optimized data. The translation layer may maintain a record of the determined location in order to enable retrieval of the data field at some point in time after the data is written to the determined memory location. The translation layer may then write the value contained in the data field in the optimized storage format to non-volatile memory at the determined location using the selected method 612.

Figure 7:
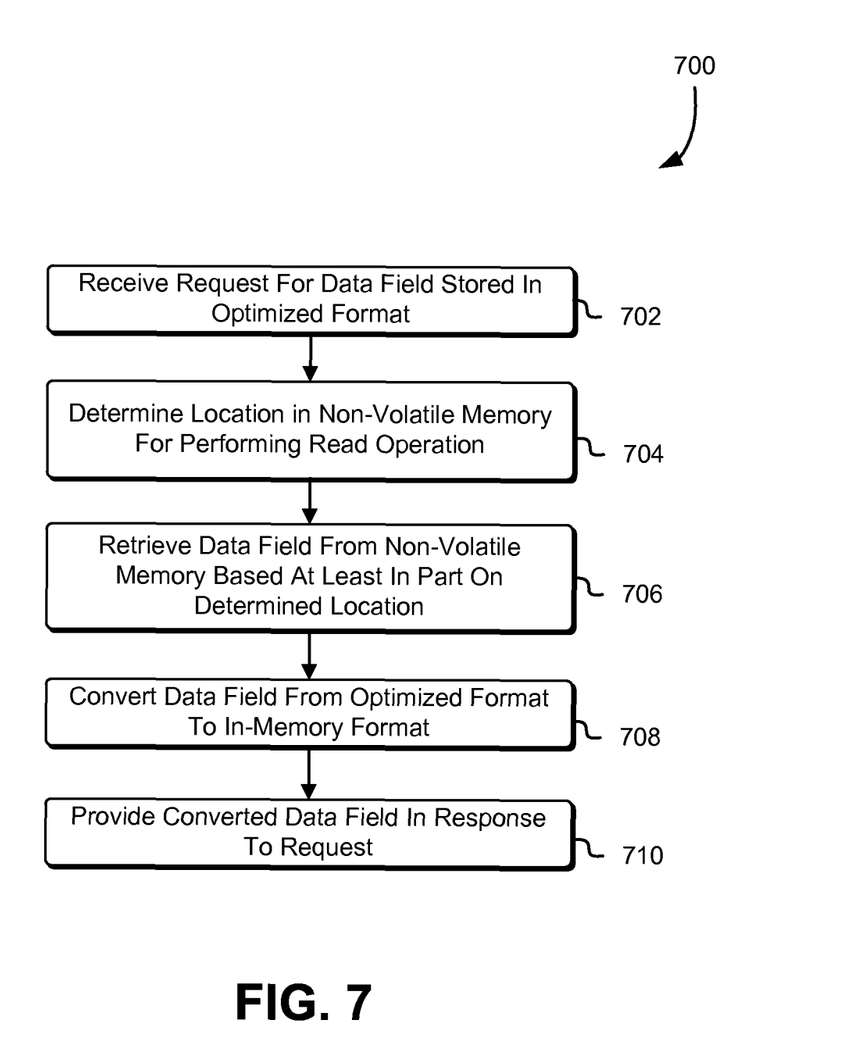
FIG. 7 is an illustrative example of a process for retrieving optimized data from non-volatile storage in accordance with at least one embodiment.

FIG. 7 shows an illustrative example of a process 700 which may be used to retrieve data stored in an optimized data format from non-volatile memory. The process 700 may be performed by any suitable system, such as by translation layer 430 as described in connection with FIG. 4. Returning to FIG. 7, in an embodiment, the process 700 includes receiving a request for a data field stored in the optimized storage format in non-volatile memory 702. The request may be received at a translation layer and may have been generated at least in part by an application attempting to interact with application data persisted in non-volatile storage. The translation layer may determine a location in non-volatile memory for performing the read operation 704 based at least in part on the received request. For example, the request may include a memory address associated with the data field, the memory address may correspond to an application memory address contained in memory allocated to the application. The translation layer may determine the location in non-volatile memory for performing the read operation based at least in part on the memory address included in the request. For example, the translation layer may obtain a record from a page table or other memory address table indicating a physical memory address for the data field corresponding to the address included in the request. In various embodiments, the address included in the request corresponds to the physical memory address of the data field. The translation layer may then retrieve the data value corresponding to the data field from non-volatile storage 706. The translation layer may retrieve the data value based at least in part on a record of an address associated with the data field stored in a memory table maintained by the translation layer.

The translation layer may then convert the data value obtained from the non-volatile memory from an optimized storage format to an in-memory format 708 The translation layer may maintain a lookup table containing conversion information suitable for converting data to and from the optimized storage format. The in-memory format may be any format used by the application to represent data values in application memory, such as two's complement format. The translation layer may then provide the converted data value in response to the request 710. For example, the translation layer or other application, such as a hypervisor, may write the converted data value into application memory.

Figure 8:
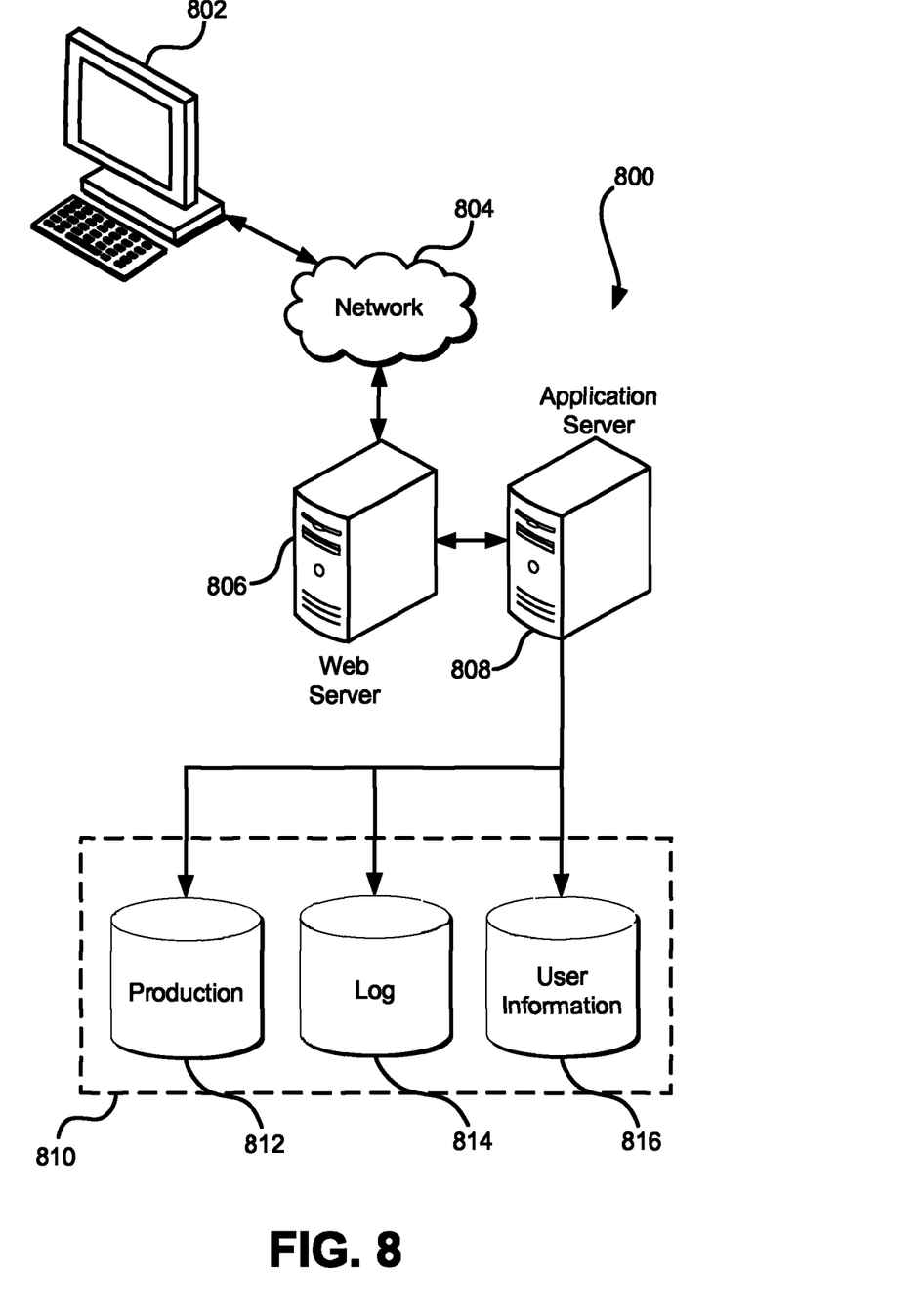
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 802 and the application server 808, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   under the control of one or more computer systems configured with executable instructions,
   determining, based at least in part on a data schema, a data field for optimization where the data schema indicates that the data field is updated in accordance with an identified sequence;
   receiving a new value to be stored in the data field, where the new value is an update to the identified sequence and where writing the new value to a non-volatile memory would utilize a first number of clear operations;
   converting the new value to an optimized storage format prior to writing the new value to the non-volatile memory of the one or more computer systems, where the optimized storage format is configured such that writing the converted new value to the non-volatile memory is performable using a second number of clear operations that is fewer than the first number of clear operations;
   determining a write address to write the new value in the optimized storage format to the non-volatile memory of the one or more computer systems; and
   writing the new value to the determined write address of the non-volatile memory.

2. The computer-implemented method of claim 1, wherein the data schema indicates that the data field is a counter and the identified sequence is a monotonically changing sequence of natural numbers.

3. The computer-implemented method of claim 1, wherein converting includes utilizing a map of values to converted values, the map configured such that for a set of updates to values of the sequence the number of clear operation is lower for converted values then non-converted values.

4. The computer-implemented method of claim 3, wherein the computer-implemented method further includes:
   receiving a request to obtain the new value from the non-volatile memory; and
   obtaining the new value from the non-volatile memory by at least:
   obtaining a location of the new value in the non-volatile memory wherein the location is determined based at least in part on a record contained in a lookup table; and
   converting the new value to an in-memory format useable by an application, where storage for the data field is allocated in storage space allocated to the application.

5. A system, comprising:
   one or more processors; and
   memory with executable instructions, that when executed by the one or more processors, cause the system to:
   receive an update to a data field, wherein the data field is suitable for optimization and the data field is updated based at least in part on one or more constraints on updating the data field;

recode the update in a second format, the second format configured to reduce a latency associated with storing the update in a first format; and store the recoded update in the memory of the system.

6. The system of claim 5, wherein the instructions that cause the system to determine the second format for representing the update further include instructions that cause the system to determine the second format based at least in part on a conversion map indicating a representation of the update in the second format.

7. The system of claim 5, wherein the memory further includes instructions, that when executed by the one or more processors, cause the system to:

execute an application; and detect a second memory for the data field, where the second memory for the data field is allocated in storage space allocated to the application.

8. The system of claim 7, wherein the instructions that cause the system to determine the data field for optimization further include instructions that cause the system to:

sample an application memory associated with the application over a period of time;

detect the one or more constraints on updating the data field based at least in part on the sampled application memory, wherein one or more updates to a sequence of values are stored in the data field; and determine the data field for optimization based at least in part on the detected one or more constraints.

9. The system of claim 5, wherein the instructions that cause the system to store the recoded update further include instructions that cause the system to determine a location to store the recoded update, wherein the location corresponds to a particular area of the memory such that the recoded update is in a separate data block of the memory from one or more non-optimized data values.

10. The system of claim 9, wherein the memory further includes instructions, that when executed by the one or more processors, cause the system to determine the particular area of the memory based at least in part on a map containing one or more records indicating an address of one or more optimized data values.

11. The system of claim 5, wherein the memory further includes instructions, that when executed by the one or more processors, cause the system to buffer the recoded update based at least in part on the update being a member of a set where at least one member of the set requires the memory to perform at least one cross-directional bit transition.

12. The system of claim 5, wherein the memory further includes instructions, that when executed by the one or more processors, cause the system to:

retrieve the recoded update from the memory in response to a request for the update; and convert the recoded update to the first format.

13. A non-transitory computer-readable storage medium having collectively stored thereon executable instructions that, when executed by one or more processors of a computer system, cause the computer system to at least:

receive a new value for a data field in a first format, where the new value is a member of a set including one or more constraints on members of the set and writing the new value to a memory of the computer system would utilize a first amount of resources of the computer system;

recode the new value in a second format for storage in the memory, where writing the second format to memory would utilize a second amount of resources of the computer system such that the second amount is less than the first amount utilized for storing one or more values of the set;

select a write operation based at least in part on a stored value associated with the data field in the memory; and store the new value in the memory using the selected write operation.

14. The non-transitory computer-readable storage medium of claim 13, wherein the instructions that cause the computer system to receive the new value for the data field further include instructions that cause the computer system to receive a flag associated with the new value for the data field indicating that the data field is to be optimized for storage with the memory.

15. The non-transitory computer-readable storage medium of claim 13, wherein the instructions further comprise instructions that, when executed by the one or more processors, cause the computer system to provide, in response to a request, the new value in the first format.

16. The non-transitory computer-readable storage medium of claim 13, wherein the instructions further comprise instructions that, when executed by the one or more processors, cause the computer system to buffer the new value prior to storing the new value in the memory.

17. The non-transitory computer-readable storage medium of claim 13, wherein the instructions further comprise instructions that, when executed by the one or more processors, cause the computer system to execute an application wherein the data field is allocated in memory allocated to the application.

18. The non-transitory computer-readable storage medium of claim 17, wherein the instructions further comprise instructions that, when executed by the one or more processors, cause the computer system to detect the data field in memory allocated to the application based at least in part on one or more previous values recorded in memory allocated to the application corresponding to the data field.

19. The non-transitory computer-readable storage medium of claim 17, wherein the instructions further comprise instructions that, when executed by the one or more processors, cause the computer system to determine that the data field is a counter utilized by the application.

20. The non-transitory computer-readable storage medium of claim 13, wherein the instructions that cause the computer system to recode the new value further include instructions that cause the computer system to recode the new value based at least in part on a map.

* * * * *